US006820939B1

United States Patent
Chen (10) Patent No.: US 6,820,939 B1
(45) Date of Patent: Nov. 23, 2004

(54) CHILD VEHICLE SEAT (75) Inventor: Shun-Min Chen, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 0 days.

(21) Appl. No.: 10/755,337

(22) Filed: Jan. 13, 2004

(30) Foreign Application Priority Data

May 1, 2003 (TW) .................................. 92208030 U (51) Int. Cl.$^7$ .............................................. B60N 2/28
(52) U.S. Cl. ................................. 297/484; 297/250.1
(58) Field of Search ........................... 297/250.1, 256.1, 297/353, 410, 484

(56) References Cited

U.S. PATENT DOCUMENTS

| | | | |
|---|---|---|---|
| 4,790,601 A | * 12/1988 | Burleigh et al. ............. 297/484 |
| 6,030,047 A | * 2/2000 | Kain ........................... 297/484 |
| 6,398,302 B1 | * 6/2002 | Freedman et al. ....... 297/250.1 |
| 6,491,348 B1 | * 12/2002 | Kain ........................... 297/484 |
| 6,626,493 B2 | * 9/2003 | Kain ........................ 297/250.1 |
| 6,688,685 B2 | * 2/2004 | Kain ........................ 297/250.1 |
| 6,695,412 B2 | * 2/2004 | Barger et al. ............... 297/484 |
| 2002/0145318 A1 | * 10/2002 | Asbach et al. ........... 297/250.1 |

* cited by examiner

Primary Examiner—Peter R. Brown
(74) Attorney, Agent, or Firm—Lowe Hauptman Gilman & Burner, LLP (57) ABSTRACT A child vehicle seat includes two anchored members secured on a rear side of a back support portion of a seat body and respectively having positioning units, a belt support member movable uprightly relative to the anchored members and having a belt guiding opening, two locking members movable longitudinally relative to the belt support member to engage or disengage two of the positioning units, an actuator movable transversely relative to the belt support member, and a coupling member for transmitting movement of the actuator to the locking members, thereby moving simultaneously the locking members to an unlocking position, where the belt support member is movable uprightly. A belt passes through the belt guiding opening so that movement of the belt support member can permit change of height position of the belt.

7 Claims, 8 Drawing Sheets

CHILD VEHICLE SEAT

CROSS-REFERENCE TO RELATED APPLICATION

This application claims priority of Taiwanese Application No. 092208030, filed on May 1, 2003.

BACKGROUND OF THE INVENTION

1. Field of the Invention

This invention relates to a child vehicle seat, more particularly to a child vehicle seat with a shoulder belt segment adjusting mechanism which permits adjustment of a height position of a seat belt thereof.

2. Description of the Related Art

Figure 1:
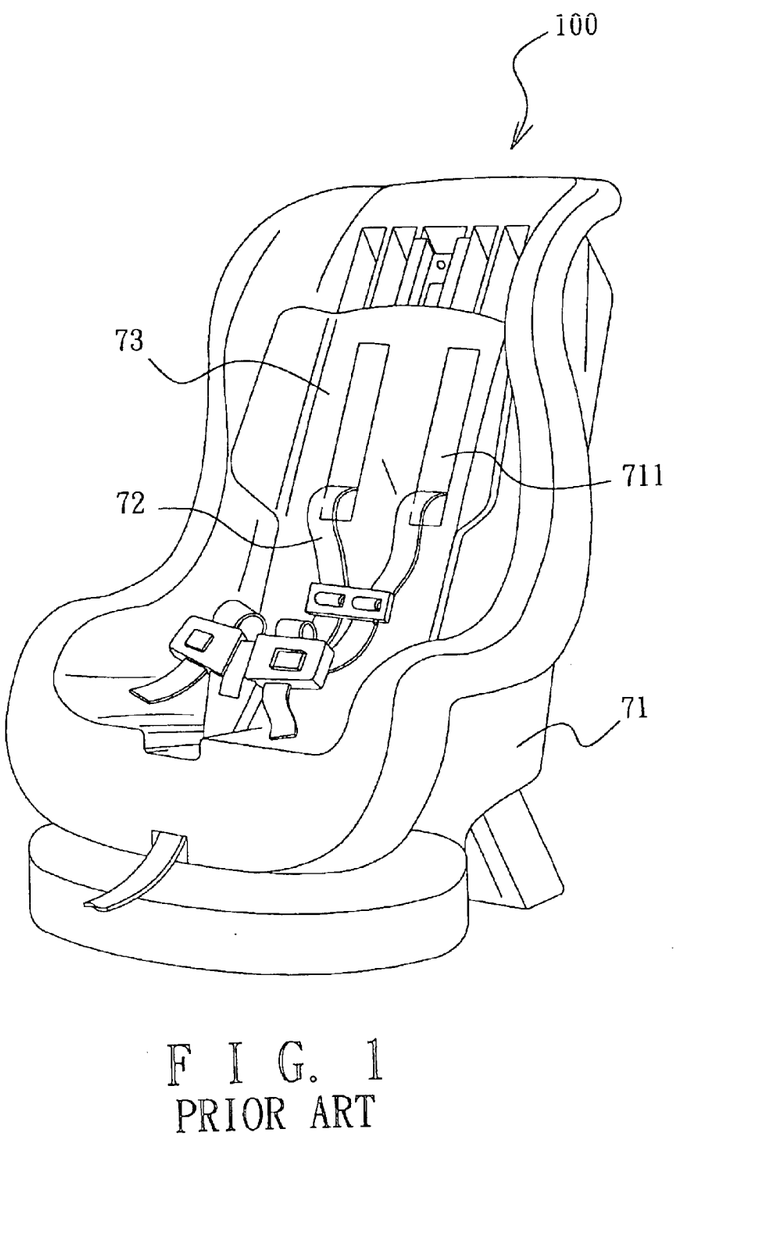
FIG. 1 is a perspective front view of a conventional child vehicle seat.
Figure 2:
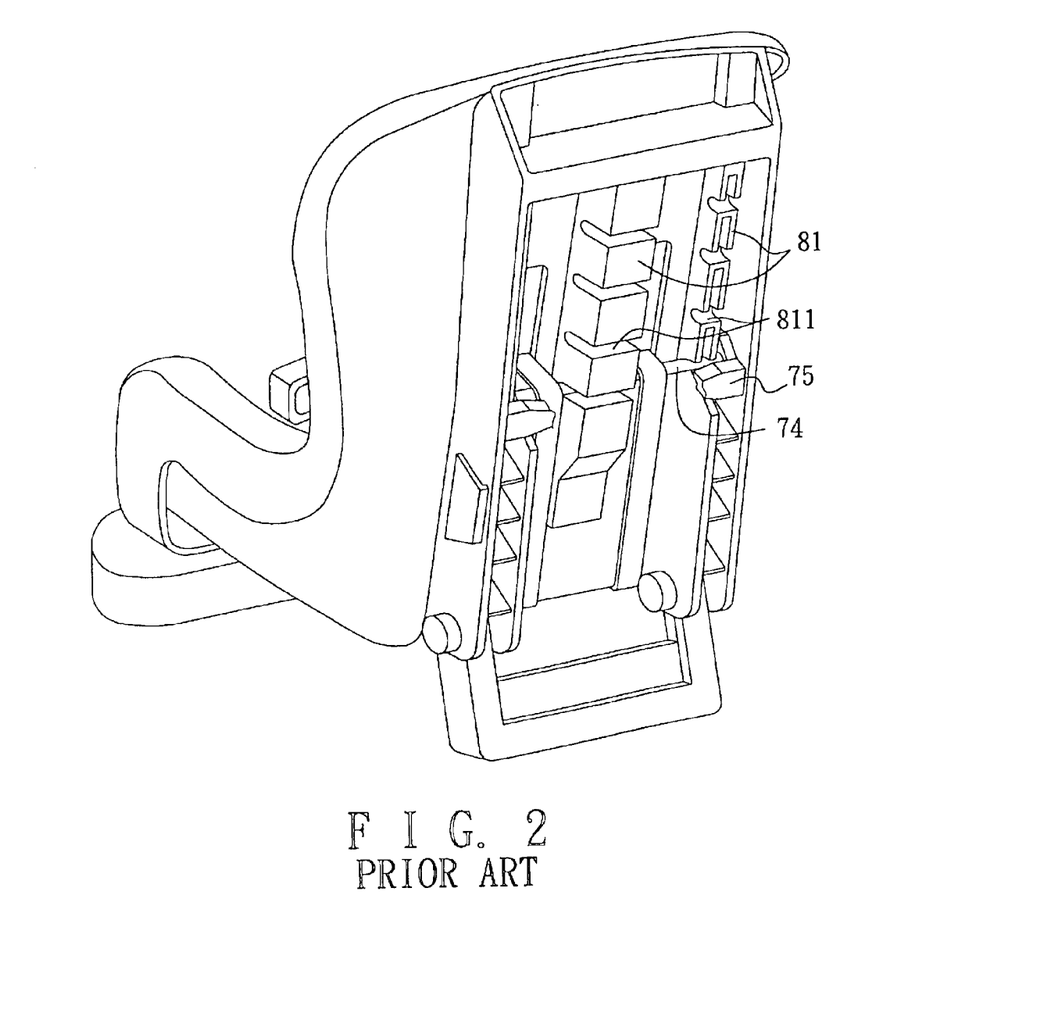
FIG. 2 is a perspective rear view of the conventional child vehicle seat.

Referring to FIGS. 1 and 2, a conventional child vehicle seat 100 is shown to include a seat body 71 and a control panel 73 movably mounted on a back support portion of the seat body 71, and formed with two slots 711 for passage of two shoulder belt portions 72 of a seat belt. A plurality of bar anchor members 81 are secured to a rear side of the back support portion and are spaced apart from one another. Each of the bar anchor members 81 has a plurality of engaging slots 811 to serve as panel height locators. A handle bar 75 has two arms which extend through the back support portion and which are coupled to the control panel 73. A belt support bar 74 is movably coupled to the arms of the handle bar 75 to engage and disengage two aligned ones of the engaging slots 811 to secure the control panel 73 at a desired height. When it is desired to adjust the height of the shoulder belt portions 72, the user must press the handle bar 75 with both hands and pull the belt support bar 74 towards the handle bar 75 with fingers so as to permit the belt support bar 74 to disengage from the engaging slots 811. Then, the user has to move the handle bar 75 as well as the whole control panel 73 until the belt support bar 74 engages two desired engaging slots 811, thereby changing the height of the shoulder belt portions 72 relative to the seat body 71. Since adjustment of the seat belt in the conventional child vehicle seat 100 needs to be conducted with both hands of the user, it is inconvenient, especially in a limited space, e.g. in the compartment of a vehicle.

SUMMARY OF THE INVENTION

The object of the present invention is to provide a child vehicle seat with a shoulder belt segment adjusting mechanism which permits convenient adjustment of a height position of a seat belt thereof using only one hand.

According to this invention, the child vehicle seat comprises a seat body adapted to be coupled to a vehicle seat. The seat body includes a bottom seat portion and a back support portion extending in an upright direction from the bottom seat portion. The back support portion has front and rear sides opposite to each other, and a belt receiving opening extending from the front side through the rear side. Right and left anchored members are secured on the rear side and outboard to the belt receiving opening in a longitudinal direction transverse to the upright direction. Each of the right and left anchored members has a plurality of positioning units displaced from one another in the upright direction. A belt support member is disposed rearwardly of the back support portion, and is movable relative to the right and left anchored members in the upright direction. The belt support member has a belt guiding opening communicated with the belt receiving opening. Right and left locking members are disposed to be movable relative to the belt guiding opening in the longitudinal direction. Each of the right and left locking members has a key end and a positioning end which is opposite to the key end in the longitudinal direction and which is movable relative to a respective one of the right and left anchored members between a locking position, where the positioning end engages one of the positioning units so as to lock movement of the belt support member relative to the right and left anchored members, and an unlocking position, where the positioning end disengages from said one of the positioning units so as to permit movement of the belt support member relative to the right and left anchored members in the upright direction. An actuator is disposed to be movable relative to the belt support member and relative to the key ends of the right and left locking members in a transverse direction relative to the longitudinal direction between first and second positions. A coupling member is disposed to couple the actuator to the key ends of the right and left locking members such that, when the actuator is moved from the first position to the second position, the positioning ends of the right and left locking members move simultaneously from the locking position to the unlocking position so as to permit movement of the belt support member in the upright direction relative to the right and left anchored members. A belt includes a top belt end which is disposed in the belt guiding opening, and a shoulder belt segment which extends from the top belt end forwardly to the front side of the back support portion through the belt receiving opening and which extends downwardly toward the bottom seat portion such that the shoulder belt segment is pullable to move in or out of the belt receiving opening when the top belt end is moved with the belt support member in the upright direction.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 3:
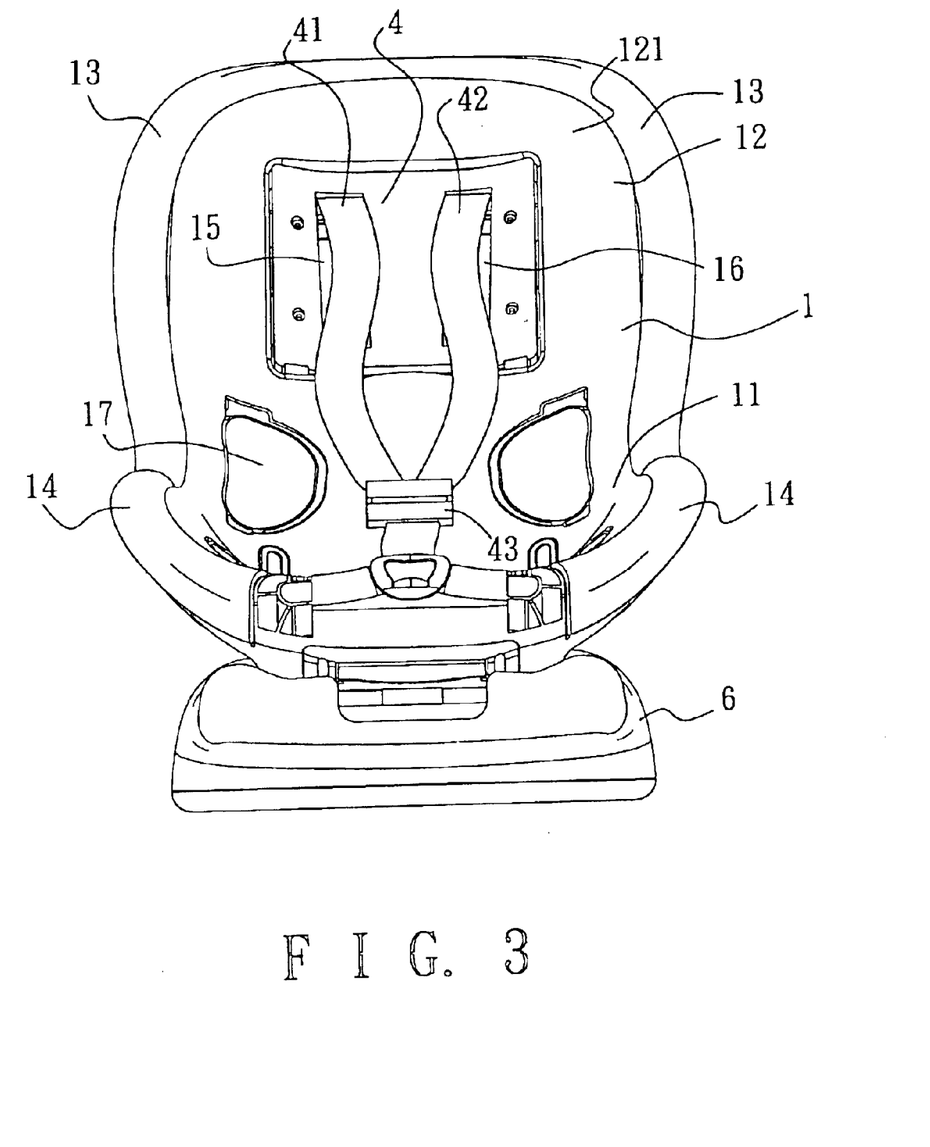
FIG. 3 is a front view of the preferred embodiment of a child vehicle seat according to this invention.
Figure 4:
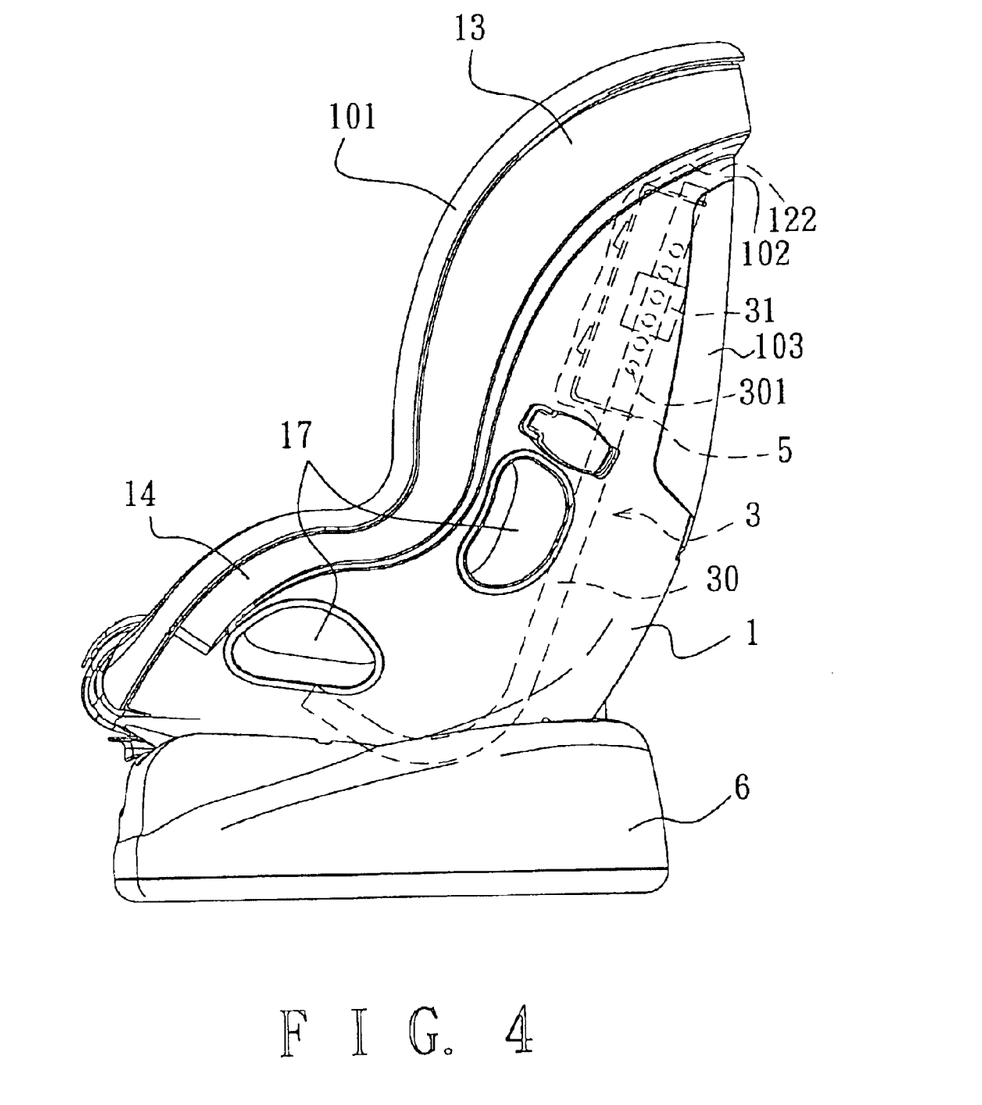
FIG. 4 is a side schematic view of the preferred embodiment.
Figure 5:
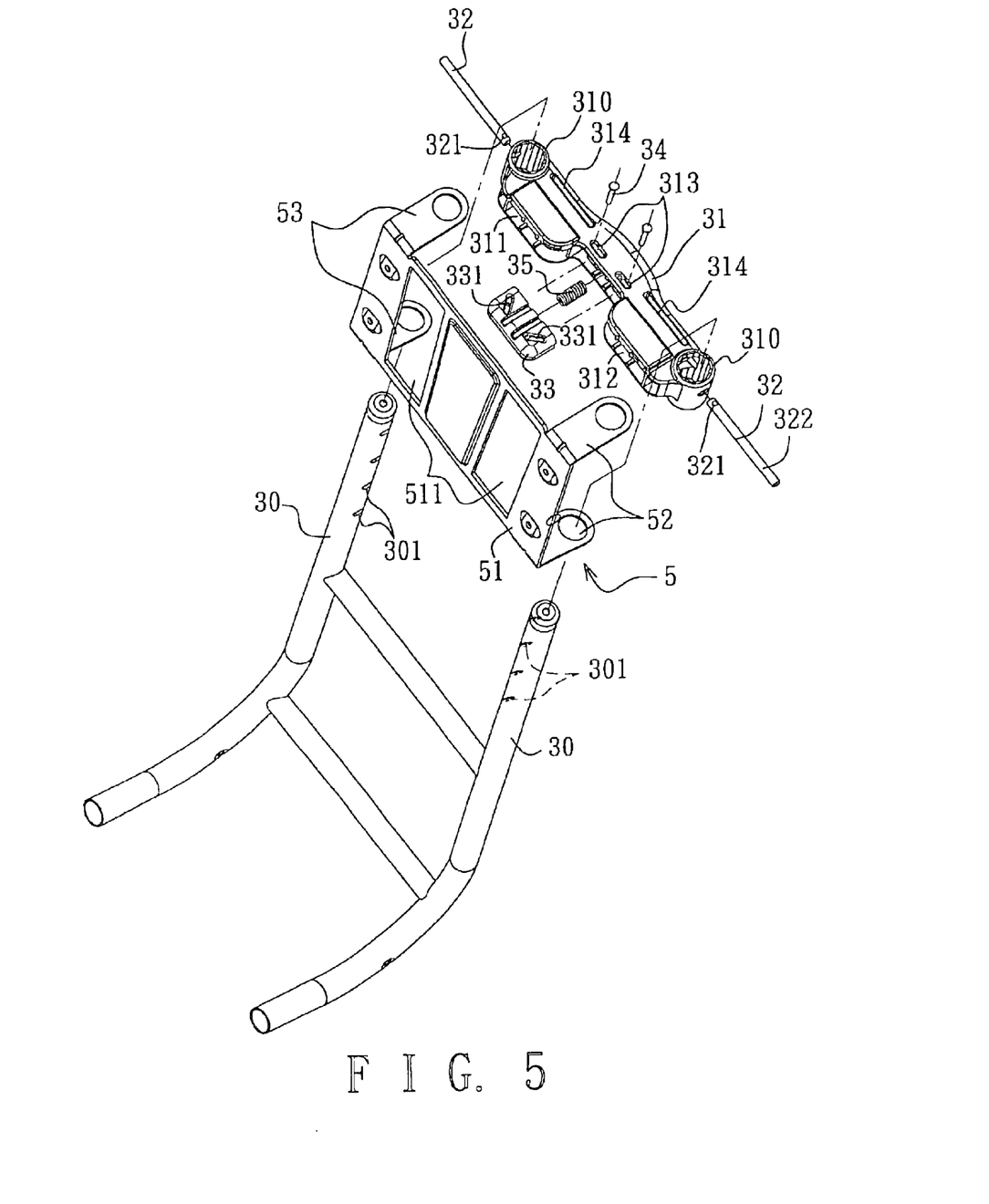
FIG. 5 is an exploded perspective view of a shoulder belt segment adjusting mechanism of the preferred embodiment.

Referring to FIGS. 3 to 5, the preferred embodiment of a child vehicle seat according to the present invention is shown to comprise a seat body 1, a shoulder belt segment adjusting mechanism 3, a seat belt 4, and a seat support 6.

The seat body 1 has a hollow structure, and includes an upper shell half 101 made from a cushioning material, and a lower shell half 102 coupled with the upper shell half 101 and having a back cover 103. The seat body 1 is adapted to be coupled to a vehicle seat (not shown), and includes a bottom seat portion 11, and a back support portion 12 extending in an upright direction from the bottom seat portion 11. The back support portion 12 has front and rear sides 121,122 opposite to each other, and a belt receiving opening with two elongated slots 15,16 which extend from the front side 121 through the rear side 122, and which are elongated in the upright direction. The elongated slots 15,16 are spaced apart from each other in a longitudinal direction transverse to the upright direction.

In addition, the seat body 1 further includes two wing portions 13 extending laterally from the back support portion 12, two side wall portions 14 extending laterally from the bottom seat portion 11, and four vehicle belt channels 17 (only two are shown) for passage of a vehicle seat belt (not shown) to secure the seat body 1 on the vehicle seat.

With reference to FIGS. 4 and 5, the shoulder belt segment adjusting mechanism 3 includes right and left anchored members 30, an elongated belt support member 31, right and left locking members 32, an actuator 33, a coupling member, and a biasing member 35.

The right and left anchored members 30 are secured on the rear side 122 of the back support portion 12 and outboard to the elongated slots 15,16 in the longitudinal direction. Each of the right and left anchored members 30 is formed as an elongated shaft, and has a plurality of positioning units 301 which are formed as positioning slots 301 and which are displaced from one another in the upright direction. The positioning slots 301 in the right anchored member 30 are aligned with those of the left anchored member 30 in the longitudinal direction, respectively. The right and left anchored members 30 may be formed integrally with each other.

Figure 9:
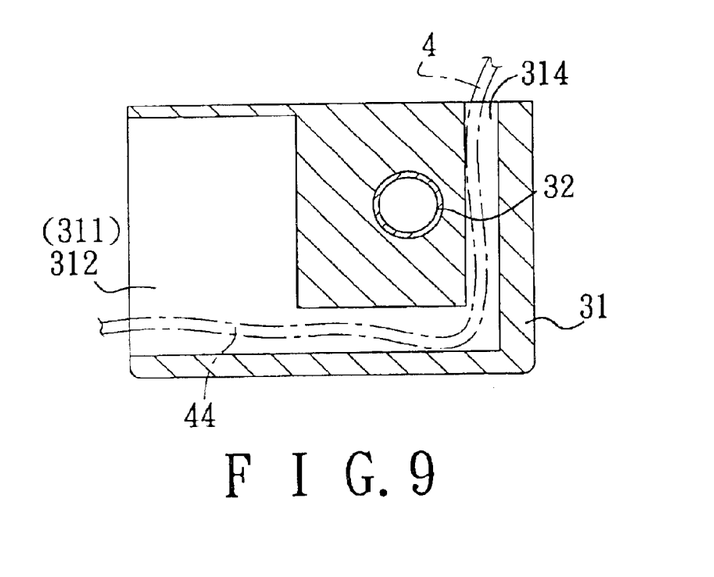
FIG. 9 is a sectional view of the shoulder belt segment adjusting mechanism shown in FIG. 6, taken along lines IX-IX thereof.

The belt support member 31 includes right and left sleeve ends 310 which are sleeved on and which are slidable along the right and left anchored members 30 in the upright direction, and a belt guiding opening with two access holes 311,312 which are disposed between the right and left sleeve ends 310 and which are communicated with and aligned with the elongated slots 15,16, respectively. In addition, two elongated slots 313 are formed in the belt support member 31 and extending along a line. Two elongated belt channels 314 are formed to be communicated with the access holes 311,312, as shown in FIG. 9.

Figure 6:
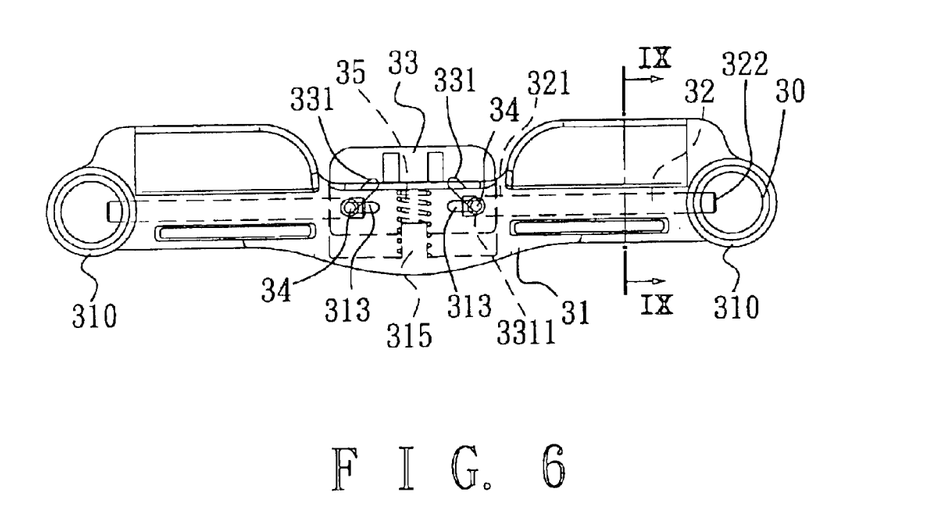
FIG. 6 is a top schematic view of the shoulder belt segment adjusting mechanism in a locked state.
Figure 7:
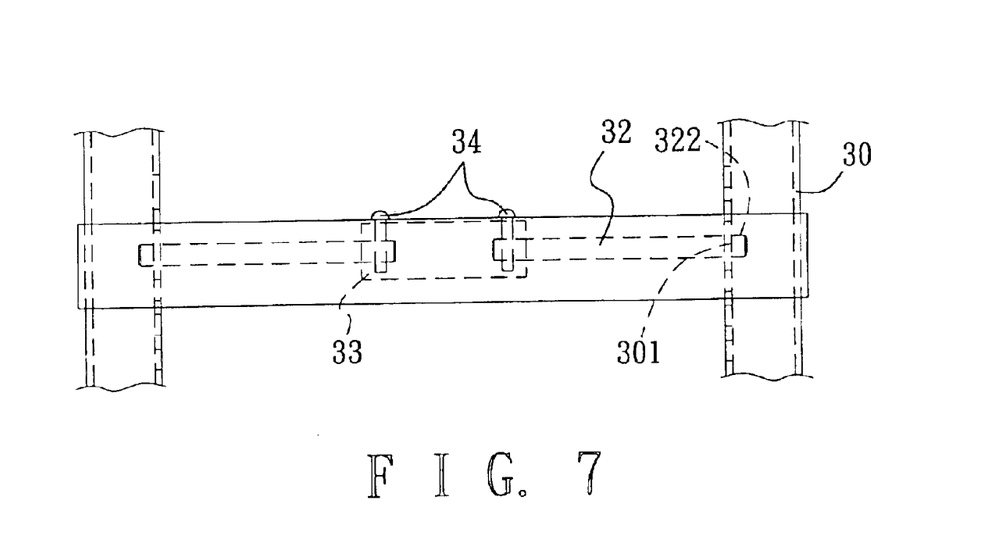
FIG. 7 is a fragmentary schematic rear view of the shoulder belt segment adjusting mechanism in the locked state.

The right and left locking members 32 are formed as two locking shafts, and are disposed in and are movable relative to the belt support member 31 in the longitudinal direction. Each of the right and left locking members 32 has a key end 321 with a hole formed therein, and a positioning end 322 which is opposite to the key end 321 in the longitudinal direction and which extends radially into a respective one of the right and left sleeve ends 310 to be retained in a corresponding one of the positioning slots 301 so as to be disposed in a locking position, as shown in FIGS. 6 and 7, thereby preventing the right and left sleeve ends 310 from moving relative to the right and left anchored members 30, respectively. The positioning ends 322 of the right and left locking members 32 are movable relative to the right and left anchored members 30 to an unlocking position, as shown in FIGS. 10 and 11, where the positioning ends 322 disengage from the corresponding ones of the positioning slots 301 so as to permit movement of the belt support member 31 relative to the right and left anchored members 30 in the upright direction.

The actuator 33 is disposed to be movable relative to the belt support member 31 and relative to the key ends 321 of the right and left locking members 32 in a transverse direction relative to the longitudinal direction between first and second positions.

Figure 10:
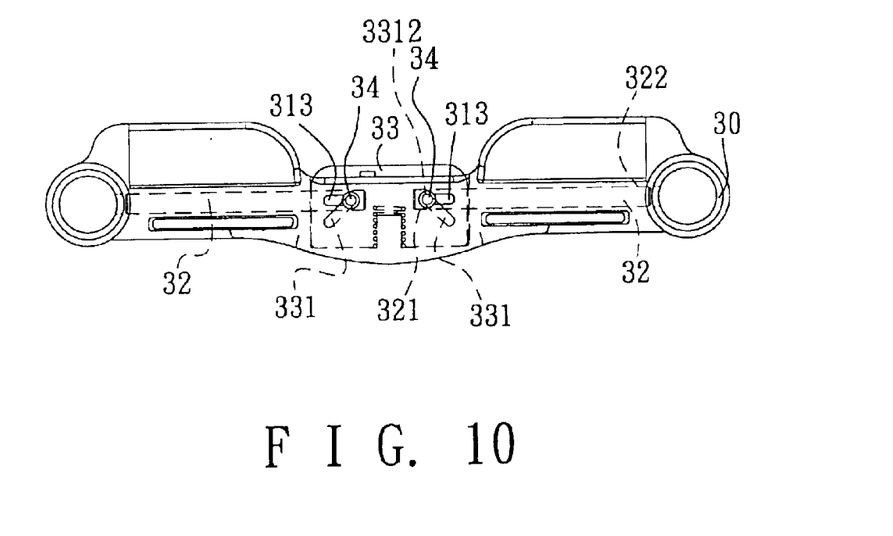
FIG. 10 is a top schematic view of the shoulder belt segment adjusting mechanism in an unlocked state.
Figure 11:
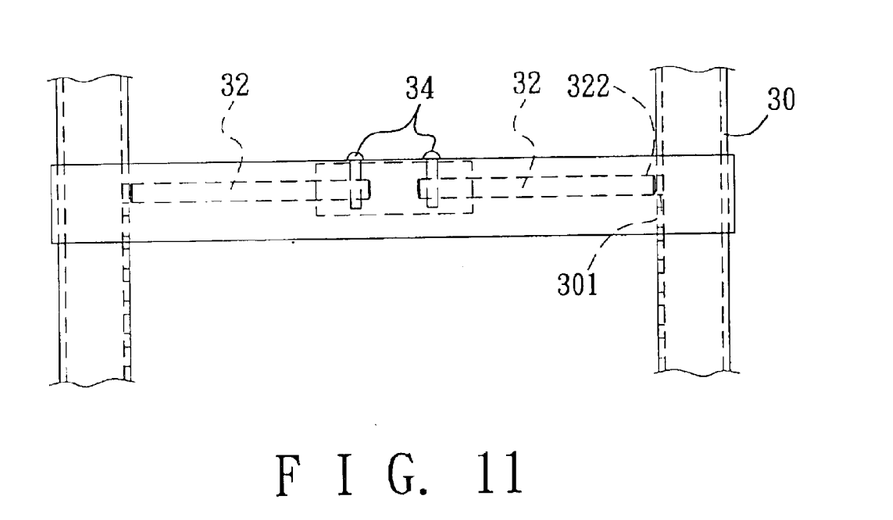
FIG. 11 is a fragmentary schematic rear view of the shoulder belt segment adjusting mechanism in the unlocked state.

With reference to FIGS. 5, 6 and 10, the coupling member includes right and left keyways 331 and right and left keys 34. The right and left keyways 331 are formed in the actuator 33, and are spaced apart from each other in the longitudinal direction. Each of the right and left keyways 331 has proximate and distal ends 3311,3312 respectively proximate to and distal from the key end 321 of a respective one of the right and left locking members 32, The distal ends 3312 of the right and left keyways 331 extend from the respective proximate ends 3311, towards each other and in the transverse direction.

The right and left keys 34 are formed as pins which are retained in the holes in the key ends 321 of the right and left locking members 32 and which extend in the upright direction. The right and left keys 34 are inserted into the elongated slots 313, the right and left keyways 331 and the holes in the key ends 321, respectively, such that the right and left keys 34 are slidable along the elongated slots 313 and along the right and left keyways 331, respectively. As such, when the actuator 33 is moved from the first position to the second position, the right and left keys 34 slide from the proximate ends 3311 towards the distal ends 3312 so as to move simultaneously the positioning ends 322 of the right and left locking members 32 from the locking position to the unlocking position, thereby permitting movement of the belt support member 31 in the upright direction relative to the right and left anchored members 30.

Figure 8:
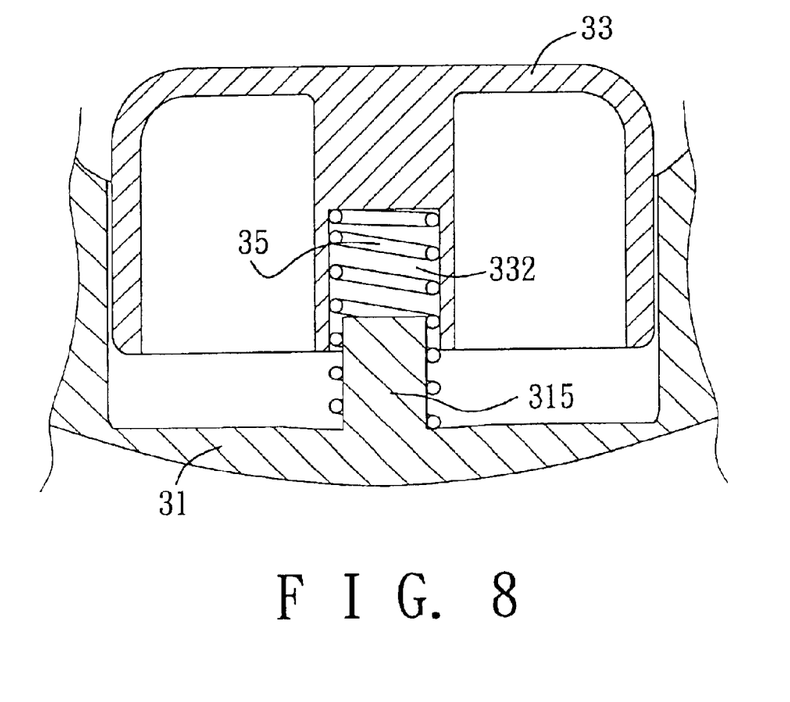
FIG. 8 is a fragmentary sectional view of a portion of the shoulder belt segment adjusting mechanism.

With reference to FIG. 8, the biasing member 35, such as a spring, has an end disposed in a channel 332 of the actuator 33 and an opposite end abutting against a protrusion 315 of the belt support member 31 so as to bias the actuator 33 toward the first position, i.e. away from the belt support member 31.

Referring to FIGS. 3, 5 and 9, the seat belt 4 includes a top belt end with two top belt end portions 44 which are respectively disposed in the access holes 311,312 and the elongated belt channel 314, and a shoulder belt segment with two shoulder belt portions 41,42 which extend from the top belt end portions 44 forwardly to the front side 121 of the back support portion 12 through the elongated slots 15,16. The shoulder belt portions 41,42 extend downwardly toward the bottom seat portion 11 and are joined to each other by a buckle 43. As such, the shoulder belt portions 41,42 are pullable to move in or out of the elongated slots 15,16 when the top belt end portions 44 are moved with the belt support member 31 in the upright direction, thereby permitting the child vehicle seat to accommodate children of various sizes.

Moreover, as shown in FIGS. 4 and 5, in order to limit an extent of movement of the right and left sleeve ends 310 of the belt support member 31, a blocking piece 5 includes a frame 51 secured to the rear side 122 of the back support portion 12, and right and left blocking members 52,53 extending rearwardly from two sides of the frame 51 and sleeved on the right and left anchored members 30, respectively. The frame 51 has two elongated holes 511 aligned with and communicated with the elongated slots 15,16, respectively, for passage of the seat belt 4 therethrough.

As shown in FIGS. 3 and 4, the seat support 6 is disposed to support the seat body 1, and facilitates placement of the seat body 1 on the vehicle seat (not shown).

When it is desired to adjust the height position of the shoulder belt segment of the seat belt 4, i.e. the position of the belt support member 31 relative to the right and left anchoring members 30 in the upright direction, the user opens the back cover 103 (see FIG. 4), grips the belt support member 31 with one hand, and presses the actuator 33 to the second position (i.e. towards the belt support member 31) with the fingers against the biasing action of the biasing member 35 such that the right and left keys 34 are moved towards each other along the right and left keyways 331. Thus, the key ends 321 are moved towards each other so as to bring the positioning ends 322 to the unlocking position, as shown in FIGS. 10 and 11, such that the belt support member 31 can be moved in the upright direction to a desired upright position. The positioning ends 322 can be moved once again to the locking position by virtue of the biasing action of the biasing member 35 when the actuator 33 is released. Therefore, the adjusting operation of the seat belt 4 can be easily conducted using only one hand.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A child vehicle seat comprising:
   a seat body adapted to be coupled to a vehicle seat, and including a bottom seat portion and a back support portion extending in an upright direction from said bottom seat portion, said back support portion having front and rear sides opposite to each other, and a belt receiving opening which extends from said front side through said rear side;
   right and left anchored members secured on said rear side and outboard to said belt receiving opening in a longitudinal direction transverse to the upright direction, each of said right and left anchored members having a plurality of positioning units which are displaced from one another in the upright direction;
   a belt support member disposed rearwardly of said back support portion, and movable relative to said right and left anchored members in the upright direction, said belt support member having a belt guiding opening which is communicated with said belt receiving opening;
   right and left locking members disposed to be movable relative to said belt guiding opening in the longitudinal direction, each of said right and left locking members having a key end and a positioning end which is opposite to said key end in the longitudinal direction and which is movable relative to a respective one of said right and left anchored members between a locking position, where said positioning end engages one of said positioning units so as to lock movement of said belt support member relative to said right and left anchored members, and an unlocking position, where said positioning end disengages from said one of said positioning units so as to permit movement of said belt support member relative to said right and left anchored members in the upright direction;
   an actuator disposed to be movable relative to said belt support member and relative to said key ends of said right and left locking members in a transverse direction relative to the longitudinal direction between first and second positions;
   a coupling member disposed to couple said actuator to said key ends of said right and left locking members such that when said actuator is moved from the first position to the second position, said positioning ends of said right and left locking members move simultaneously from the locking position to the unlocking position so as to permit movement of said belt support member in the upright direction relative to said right and left anchored members; and
   a belt including a top belt end which is disposed in said belt guiding opening, and a shoulder belt segment which extends from said top belt end forwardly to said front side of said back support portion through said belt receiving opening and which extends downwardly toward said bottom seat portion such that said shoulder belt segment is pullable to move in or out of said belt receiving opening when said top belt end is moved with said belt support member in the upright direction.

2. The child vehicle seat of claim 1, further comprising a biasing member disposed to bias said actuator toward the first position.

3. The child vehicle seat of claim 2, wherein each of said right and left anchored members is an elongated shaft which is secured to said rear side of said back support portion, each of said positioning units being configured to be a positioning slot for retaining a corresponding one of said positioning ends of said right and left locking members therein.

4. The child vehicle seat of claim 3, wherein said coupling member includes
   right and left keyways which are formed in said actuator, and which are spaced apart from each other in the longitudinal direction, each of said right and left keyways having proximate and distal ends respectively proximate to and distal from said key end of a respective one of said right and left locking members, said distal ends of said right and left keyways extending from said proximate ends, respectively, towards each other and in the transverse direction,
   right and left keys which are respectively secured to said key ends of said right and left locking members and which extend in the upright direction to be received in and to be slidable along said right and left keyways such that, when said actuator is moved from the first position to the second position, said right and left keys respectively slide from said proximate ends towards said distal ends so as to move said positioning ends of said right and left locking members from the locking position to the unlocking position.

5. The child vehicle seat of claim 4, wherein said belt support member has right and left sleeve ends which are disposed outboard to said belt guiding opening and which are sleeved on and which are slidable along said right and left anchored members, said positioning end of each of said right and left locking members extending radially into a respective one of said right and left sleeve ends so as to be retained in a corresponding one of said positioning slots, thereby preventing said right and left sleeve ends from moving relative to said right and left anchored members, respectively.

6. The child vehicle seat of claim 5, further comprising right and left blocking members which are disposed on said right and left anchored members, respectively, to limit an extent of movement of said right and left sleeve ends of said belt support member when said positioning ends are in the unlocking position.

7. The child vehicle seat of claim 1, wherein said belt receiving opening includes two elongated slots which are elongated in the upright direction and which are spaced apart from each other in the longitudinal direction, said belt guiding opening including two access holes which are respectively communicated with and which are aligned with said elongated slots, said top belt end of said belt including two top belt end portions which are respectively disposed in said access holes, said shoulder belt segment including two shoulder belt portions which extend from said top belt end portions forwardly to said front side of said back support portion through said elongated slots, respectively.

* * * * *